United States Patent
Van Lydegraf et al.

(10) Patent No.: US 6,441,579 B1
(45) Date of Patent: Aug. 27, 2002

(54) CURRENT MAGNITUDE VARIATION CORRECTION FOR OPEN LOOP STEPPER MOTOR DRIVER CIRCUIT

(75) Inventors: Curt Van Lydegraf, Eagle; Steve Gothard, Boise; Steve Kranz, Eagle; Gary T. Brown, Middleton, all of ID (US)

(73) Assignee: Hewlett-Packard Company, Palo Alto, CA (US)

( * ) Notice: Subject to any disclaimer, the term of this patent is extended or adjusted under 35 U.S.C. 154(b) by 0 days.

(21) Appl. No.: 09/771,157

(22) Filed: Jan. 26, 2001

(51) Int. Cl.[7] ................................................ H02P 8/00
(52) U.S. Cl. .................... 318/696; 318/430; 318/431; 318/685; 318/696; 318/798; 318/799; 318/800; 318/815; 388/906; 388/930
(58) Field of Search ................... 318/685, 696, 318/798, 799, 800, 815, 430, 431; 388/906, 930

(56) References Cited

U.S. PATENT DOCUMENTS

| | | | | |
|---|---|---|---|---|
| 4,471,283 A | * | 9/1984 | Presley | 318/696 |
| 4,477,756 A | * | 10/1984 | Moriguchi | 318/696 |
| 4,496,891 A | * | 1/1985 | Kobayashi | 318/696 |
| 4,857,960 A | * | 8/1989 | Hosaka et al. | 355/208 |
| 4,901,000 A | * | 2/1990 | Center et al. | 318/696 |
| 4,961,037 A | * | 10/1990 | Orii et al. | 318/696 |
| 5,838,132 A | * | 11/1998 | Tanaka | 318/685 |
| 6,208,107 B1 | * | 3/2001 | Maske et al. | 318/685 |
| 6,211,642 B1 | * | 4/2001 | Holdaway | 318/696 |
| 6,316,902 B1 | * | 11/2001 | Kitamura | 318/671 |

* cited by examiner

*Primary Examiner*—Robert E. Nappi
*Assistant Examiner*—Tyrone Smith

(57) ABSTRACT

An available input of to a motor controller is used to measure the motor power supply voltage. Typically, a scaled down version of the voltage is sensed. The microprocessor is used to calculate the motor control current, in that case, is then calculated from the scaled down version. A scale factor that depends upon the sensitivity of the motor current to the motor supply voltage is calculated by the microprocessor. Driving parameters in the controller are then adjusted to account for the scale factor. In a preferred embodiment, the driving parameters are PWM parameters, and the microprocessor multiplies the measured power supply voltage to obtain a scale factor that can then be multiplied by the nominal PWM values to obtain the new PWM values.

11 Claims, 2 Drawing Sheets

CURRENT MAGNITUDE VARIATION CORRECTION FOR OPEN LOOP STEPPER MOTOR DRIVER CIRCUIT

FIELD OF THE INVENTION

The field of the invention is open loop stepper motor control.

BACKGROUND OF THE INVENTION

Stepper motors use a plurality of set positions, called steps, to provide controlled movement. Variation of current and its polarity moves a rotor of the motor through the steps, or to a fixed position at a particular step. Since the steps provide definite positioning under normal operating conditions, there is no need for feedback to verify a movement ordered by a stepper motor controller. This type of open loop operation makes stepper motors a popular choice for numerous devices. The stepper motors are an important part of many image scanner products, for example, such as multi-function peripherals (MFP) and sheet fed facsimile machines.

Feedback is often used, however, to monitor the power applied to a stepper motor. Accuracy of stepper motor positioning, and the timing with which positions are reached during motor operation both have an important affect on the operation of many such devices. Load inertia needs to be overcome, and it is often important that the rotor be accelerated and decelerated at an accurately controlled rate.

Performance issues are intertwined with cost issues in image scanning and similar devices. Size of stepper motors used in devices affects the cost of such devices. Smaller motors are more cost effective, but must be accurately controlled. This has led to careful designs of stepper motors and their controllers in image scanning devices.

Designs seek to control the rate of acceleration and deceleration to decrease the maximum torque required from the stepper motor. Lower torque motors are generally smaller and less costly. However, the smaller motor operates closer to the minimum torque required by the device and is therefore more sensitive to changes in the power supply voltage. The torque output of the motor decreases with power supply voltage Designs must allow for variation in the power supply. A typical solution is a feedback through a sense resistor that provides information about the power applied to the stepper motor. The feedback can be used to account for power supply variations. However, the feedback arrangements are more complicated than open loop control. The open loop control must account for power variation without direct feedback from a motor power circuit, typically an H-bridge circuit. Generally, this has been addressed through motor performance specifications.

In designing the open loop control of a motor used in an image scanner, for example, steps are typically taken to ensure that the minimum required torque output for the stepper motor is met at low voltage power supply conditions. The minimum allowable torque output of the motor is measured at low voltage to determine any compensation necessary in motor control to ensure that the minimum torque is met. Voltage variations on the high end do not cause the same torque concerns, since the torque at high voltage will exceed the amount needed for device operation. Variation of power supply voltage on the high end raises other concerns, however. Under a high voltage condition, the stepper motor can exceed its thermal limits and be damaged.

Stepper motor control frequently relies upon pulse width modulation (PWM) switching to control motor voltage and current to obtain higher efficiency than linear control. PWM refers to variable on/off times (or width) of the voltage pulses applied to the transistors regulating voltage delivered to the motor. Variance in driving current delivered from transistors via PWM or another technique is the primary factor affecting the accuracy and timing of stepper motor positioning. Failure of a stepper motor can occur when driving current enters thermal limits of the motor.

A typical image scanning device using a stepper motor includes an image processing function, a print control function, and a motor control function. The separate functions are most often implemented by separate application specific integrated controllers (ASICs). The motor controller function often uses PWM. A PWM motor controller in a typical image scanning device can be programmable. The image processing function will typically include multiplexing and analog to digital conversion capability. The print control function typically includes a microprocessor.

There is a need for an improved open loop stepper motor control usable in such an image scanning device or similar device.

SUMMARY OF THE INVENTION

In a device such as an image scanning device that includes a microprocessor and a programmable motor controller, the invention compensates for a change in power supply voltage such that the motor exceeds the minimum torque required at low voltage without exceeding the maximum temperature at high voltage. An available controller input is used to sense a voltage provided by the power supply. The sensed value is used to calculate a scale factor dependent sensitivity of current in the stepper motor to the voltage provided by the power supply. Driving parameters in the programmable motor controller are then adjusted to drive the stepper motor as a function of the scale factor.

In a preferred embodiment, a scaled down version of the power supply voltage is sensed. A scale factor that depends upon the sensitivity of the motor current to the motor supply voltage is calculated by the microprocessor. Driving parameters in the controller are then adjusted to account for the scale factor. In a preferred embodiment, the driving parameters are PWM parameters, and the microprocessor multiplies the measured power supply voltage to obtain a scale factor that can then be multiplied by the nominal PWM values to obtain the new PWM values. Preferably, scale factors are different for cases of gain and attenuation.

DETAILED DESCRIPTION OF THE PREFERRED EMBODIMENTS

In the invention, a controller input is used to sense a voltage provided by the power supply to a stepper motor at predetermined times, e.g., at power up or at each time a device is initialized for a job. This value is used to calculate a scale factor dependent on the sensitivity of current in the stepper motor to the voltage provided by the power supply. Driving parameters are then set as a function of the scale factor to account for variations in the power supply.

A typical environment for application of the invention is in a device, such as an image scanning device which makes use of the open loop control of a stepper motor to position a portion of the scan apparatus. However, similar open loop stepper motor control circuits will also benefit from the invention, as will be appreciated by artisans. Generally, the invention requires an available input which can be used to sense a power supply voltage.

Figure 1:
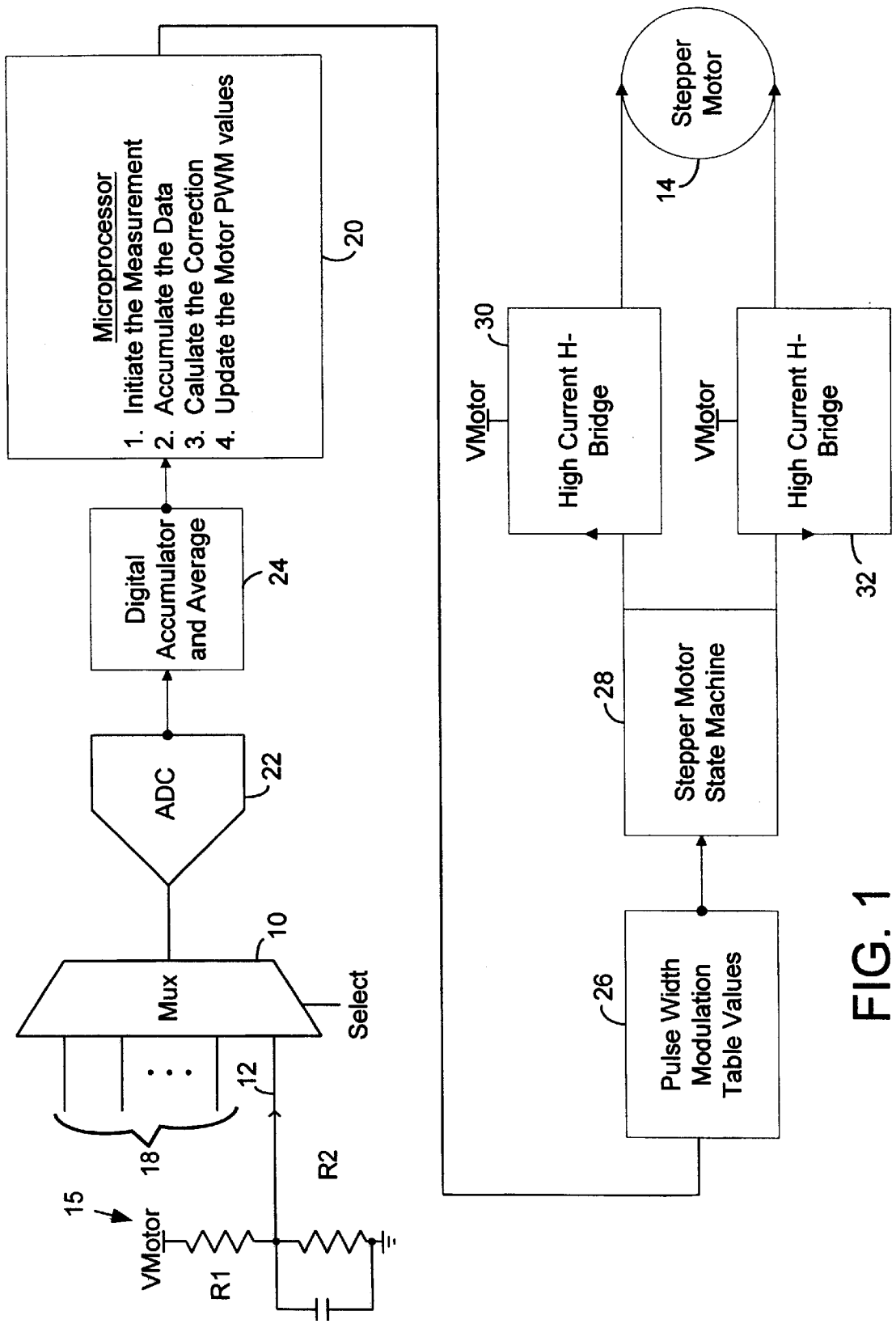
FIG. 1 is a block diagram of a preferred stepper motor control system to which the invention is applied.

FIG. 1 illustrates a preferred general environment for application of the invention, where a multiplexor 10 has an otherwise unused input 12 which the invention uses to apply a voltage value corresponding to the power supply for a stepper motor 14. In FIG. 1, the power supply voltage is stepped down by a voltage division circuit 16 to limit the value of the voltage applied to the input 12. Remaining inputs 18 of the multiplexor 10 will include a set of control signals relating to the device in which the FIG. 1 circuit is used, control signals used to have the stepper motor 14 cooperate and synchronize with other operations of the device. In the case of a scanner for example, this control signals will synchronize motor operation with image operations carried out by illumination and image pickup devices in the scanner.

Output of the multiplexor is selectively applied, under control of a processor 20 to an analog to digital converter ADC 22. An accumulator 24 averages samples and an average value over a predetermined time is submitted to the processor 22 for analysis. The microprocessor drives the stepper motor by designating pulse with modulation (PWM) values from a pulse width modulation table 26. The state machine 28 stores motor position information and controls the percentage of power applied from a V motor power supply from separate high current H-bridge circuits 30, 32. In this type of open loop design, the H-bridge circuits lack a sense resistor or feedback that would provide direct information about current in the stepper motor 14. This type of open loop control continues during normal operation to move the stepper motor through and to particular positions at particular rates.

The FIG. 1 environment is similar to an environment found in a scanner, for example. A typical scanner might include the multiplexer 10, ADC 20, and digital accumulator 24 as part of an image processing ASIC. The microprocessor 20 might be part of a printer ASIC, and the pulse width modulation table 26, stepper motor state machine 28, and H-bridge circuits 30, 32 part of a motor control ASIC. According to the invention, an available input of the image processing ASIC is used to input the V motor voltage under control of the microprocessor programmed to conduct scaling according to the principles of the invention. Preferably, the analog to digital converter has a greater degree of precision (sufficient number of bits) than the potential number of steps in variation of the motor current. This permits the microprocessor 20 to calculate a scale factor to account for variations according to the actual variation conditions.

Figure 2:
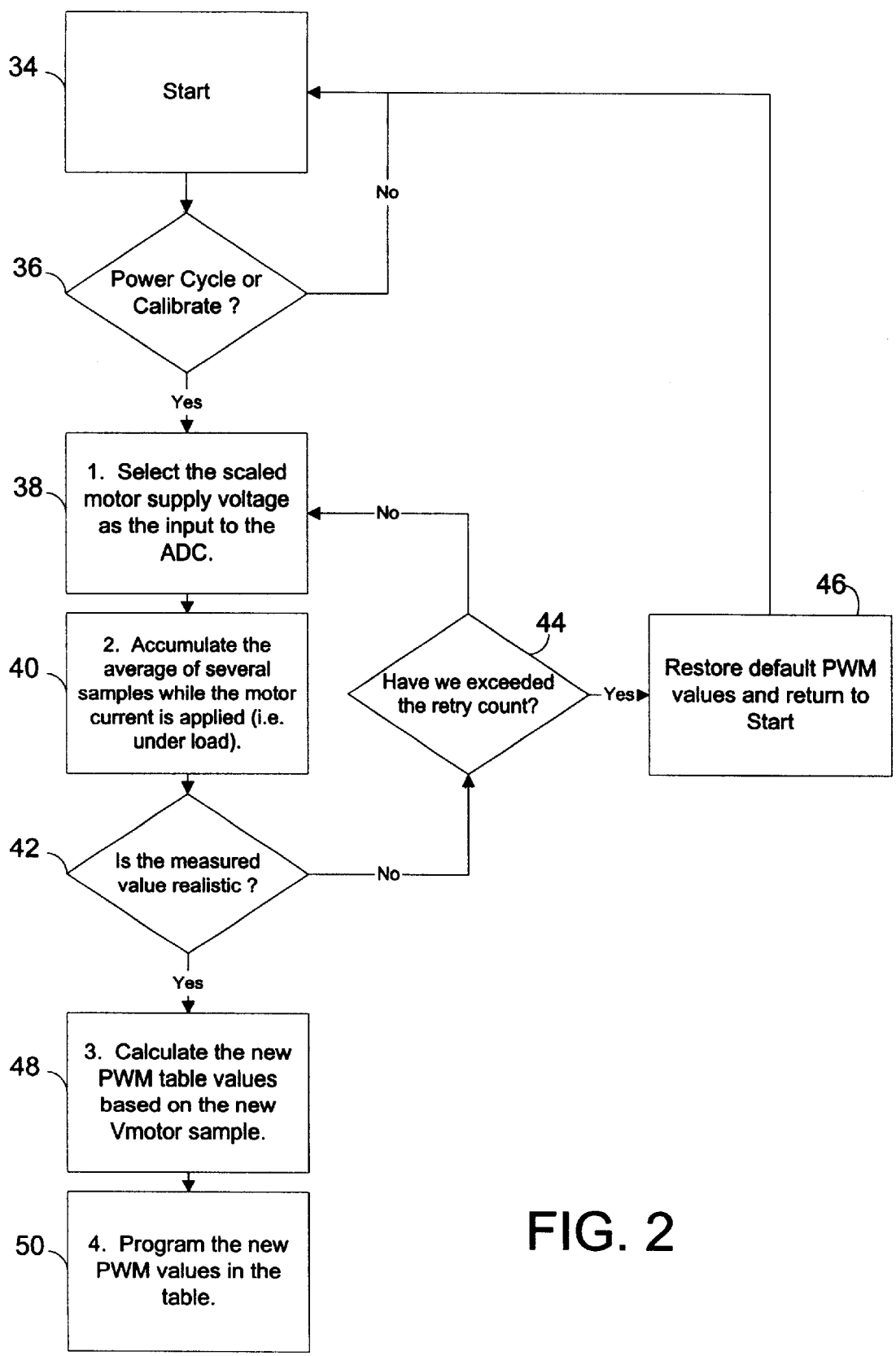
FIG. 2 is a flowchart illustrating a preferred embodiment of the present method as implemented in the system of FIG. 1.

Using the scaled value of the V motor power supply obtained at the input 12, the invention has the processor 22 periodically run a calibration cycle that can update the PWM values in the PWM table 26 to correct for variations in the power supply. A preferred set of steps for the processor to accomplish the calibration cycle is shown in FIG. 2. The calibration routine starts 34 and then a check is made 36 to see if it is time to conduct a calibration. Preferably, this is conducted periodically or at each initiation of a job to be conducted by a device including the stepper motor 14. Other events might also trigger a calibration cycle, though. For example, the cycle might be conducted in response to the completion of some other control routine.

If the calibration cycle is to run, the processor 22 then selects 38 the scaled power supply voltage from the multiplexor input 12 as the input to the ADC 20. Preferably, several samples of the value are accumulated and averaged 40 in the accumulator 24 while a load is applied to the motor 14. The processor examines the averaged value to determine if it falls 42 within a range of realistic values. If the value is unrealistic, a retry 44 is attempted and would be repeated until a retry count is exceeded. When the retry count is exceeded, a set of default PWM values is restored 46.

When a realistic value is measured, the processor then calculates a scale factor to scale the PWM values and produce 48 a new set of PWM values based upon the measured motor voltage sample. These updated set of PWM values are stored 50 in the PWM table. This calculation is achieved, for example, by having the microprocessor 22 calculate the motor control current from the scaled down version of the measured voltage. A scale factor that depends upon the sensitivity of the motor current to the motor supply voltage is calculated by the microprocessor. Driving parameters in the controller are then adjusted to account for the scale factor. The microprocessor 22 then multiplies the measured power supply voltage to obtain a scale factor that can then be multiplied by the nominal PWM values to obtain the new PWM values.

The scale factor calculation by the microprocessor 20 may be tailored to suit particular desirable operating conditions of the stepper motor 14. As an example, it is often desirable to have the first few PWM values in a set saturated at maximum to increase the speed of operation of the motor. A preferred implementation of the scale factor calculation would be different depending upon whether a gain or attenuation is being compensated for in scaling PWM values. If it is assumed that the actual maximum PWM value is 255, for example, a first few PWM values in a set would be set a maximum of 255, while others would be set at a maximum of 254, slightly less than the actual potential maximum value. Then, if an adjustment is made to increase PWM values and newly scaled PWM values are greater than 255, then the scaled value is saturated at 255. If the adjustment is to decrease and the original PWM value is 255, it is left at 255 to preserve the initial acceleration in a motor movement. However, if the adjustment is to decrease and the original PWM value is less than 255, than a scaling is conducted. This allows certain values (near the leading edge of a current waveform) to be left at a saturated value to preserve initial motor acceleration in a movement (by reducing motor current rise time), while allow for the compensation of motor supply voltage in remaining values. Such an algorithm ensures that scaled values exceeding the maximum are saturated at the maximum value (255 in this case). Of course, other variations to preserve certain values at or below saturation will be apparent to artisans.

While various embodiments of the present invention have been shown and described, it should be understood that other modifications, substitutions and alternatives are apparent to one of ordinary skill in the art. Such modifications, substitutions and alternatives can be made without departing from the spirit and scope of the invention, which should be determined from the appended claims.

Various features of the invention are set forth in the appended claims.

What is claimed is:

1. In a device including a microprocessor and a programmable motor controller which conducts an open loop control of power from a power supply to a stepper motor, a method for open loop control of power from the power supply to the stepper motor, the method comprising steps of:

sensing a voltage provided by the power supply through an input to the microprocessor;

calculating, in the microprocessor, a scale factor dependent on sensitivity of current in the stepper motor to the voltage provided by the power supply; setting driving parameters in the programmable motor controller to drive the stepper motor as a function of the scale factor, wherein the driving parameters comprise sets of pulse width modulation values, and said step of setting preserves PWM values at a leading edge of a current waveform at a maximum value to minimize motor current rise time.

2. The method according to claim 1, wherein said step of sensing comprises sensing a scaled down version of the voltage supplied by the power supply.

3. The method according to claim 1, wherein said step of setting comprises setting a voltage level per step to drive the stepper motor between steps.

4. The method according to claim 1, wherein the sets of PWM values corresponding to the leading edge are set at an actual maximum value, and the maximum value of remaining PWM values in a set are set to a maximum less than the actual maximum value, and said step of setting:

preserves a PWM value set at the actual maximum value when the scale factor indicates an adjustment to decrease PWM values, and scales a PWM value set below the maximum value if the scale factor indicates an adjustment is to decrease PWM values.

5. The method according to claim 1, wherein said step of sensing is conducted at the initiation of a job in said device.

6. The method according to claim 1, wherein said step of sensing comprising accumulating and averaging samples and using the averaged sample as the voltage sensed.

7. The method according to claim 1, wherein the device is a device including an image processing ASIC having an analog to digital converter, a printer ASIC including the microprocessor and a motor controller ASIC including the programmable motor controller, and wherein:

said step of sensing is conducted by the analog to digital converter and provided to the microprocessor, and the analog to digital converter has greater precision than a potential number of steps in variation of motor current in the stepper motor.

8. In a device including a microprocessor and a programmable motor controller which conducts an open loop control of power from a power supply to a stepper motor, a method for open loop control of power from the power supply to the stepper motor, the method comprising steps conducted in the microprocessor of:

checking the voltage supplied to the stepper motor by the power supply under load conditions;

determining whether the voltage checked in said step of checking is realistic, then if the voltage is unrealistic, repeating said steps of checking and determining until a realistic value is reached or said steps of checking and determining are repeated a predetermined number of times, if said voltage is unrealistic after said steps of checking and determining are repeated a predetermined number of times, restoring a set of default motor driving parameters to be used by the programmable motor controller, if the voltage is realistic, calculating a new set of motor driving parameters based upon the voltage and setting the new set of motor driving parameters to be used by the programmable motor controller.

9. The method according to claim 8, wherein said voltage checked in said step of checking is a scaled down version of the motor supply voltage.

10. The method according to claim 8, wherein said step of checking comprises accumulating a plurality of samples of the motor supply voltage and averaging said samples to produce a value representative of the voltage supplied by the stepper motor.

11. The method according to claim 8, wherein said step of calculating a new set of driving parameters comprises multiplying a previous set of driving parameters by a scale factor determined based upon the voltage checked in said step of checking.

* * * * *